United States Patent [19]

Rabb

[11] Patent Number: 4,879,812

[45] Date of Patent: Nov. 14, 1989

[54] AERIAL MAP NAVIGATIONAL AID

[76] Inventor: Randolph W. Rabb, 7910 Pat St., La Mesa, Calif. 92042

[21] Appl. No.: 238,902

[22] Filed: Aug. 31, 1988

[51] Int. Cl.[4] ............................................... B43I 7/00
[52] U.S. Cl. .................................. 33/1 MP; 33/431; 33/457
[58] Field of Search ................... 33/431, 1 MP, 1 PT, 33/456, 457

[56] References Cited

U.S. PATENT DOCUMENTS

| | | |
|---|---|---|
| 2,085,059 | 6/1937 | Woodside ............................ 33/431 |
| 2,736,096 | 2/1956 | Greene . |
| 3,187,434 | 6/1965 | Casagrande . |
| 3,281,942 | 11/1966 | Preuit . |
| 3,387,372 | 6/1968 | Sabadiskin . |
| 3,690,009 | 9/1972 | Henley, III . |
| 3,813,783 | 6/1974 | Price . |
| 3,844,042 | 10/1974 | Hodge . |
| 3,881,253 | 5/1975 | Haws . |
| 4,095,342 | 6/1978 | Oertli . |
| 4,359,628 | 11/1982 | Lambert . |

Primary Examiner—Harry N. Haroian
Attorney, Agent, or Firm—Baker, Maxham, Jester & Meador

[57] ABSTRACT

A pair of transparent pressure sensitive stick-on film disks in the form of compass roses and a pair of transparent film VOR arms are removably attached to the center of the roses by cooperating male/female snap mechanisms. The VOR arms can be manually rotated to compass directions indicated on a VOR receiver and the cross-fix represented by the crossing of center-lines printed on the VOR arms represents the location of the aircraft on the map. Friction bearings associated with the snap mechanisms hold the arms in fixed positions after they have been rotated to the desired compass directions.

12 Claims, 1 Drawing Sheet

AERIAL MAP NAVIGATIONAL AID

BACKGROUND OF THE INVENTION

The present invention relates to devices for navigation, and more particularly, to a navigational aid designed to enable a private aircraft pilot to more easily determine his or her position.

The Federal Aviation Administration (FAA) has established a system of beacons installed all across the United States called VOR beacons. VOR stands for "VHF omni directional receiver" and refers to the receiver on an aircraft that picks up a radial carrier wave from a beacon as it sweeps through three hundred and sixty degrees. Thus, a pilot knows what beacon he or she is receiving and what radius his or her aircraft is located is on. By using two different beacons and triangulating, the pilot can get a position fix.

The FAA disseminates maps that have VOR compass rose markings pre-printed around each beacon, which are rings imprinted on the maps with compass numbers on the same. While flying solo, it is difficult for a pilot to find these rings because the maps have so many other crowded markings and the ink is not very visible. It is further difficult for a pilot to mark out the correct triangulation lines to determine his or her position. This is usually done with a ruler and a pencil.

U.S. Pat. No. 3,387,372 of Sabadishin discloses a lap held plotting board including a pair of transparent plastic compass roses which are pinned to a map supported on the board. The board is made of laminations of cork, paper and MASONITE. A linear scale is mounted to each compass rose for rotation about the axis of its mounting pin. Each compass rose has a dish configuration which is deflected to establish sufficient frictional force with the map to prevent rotation of the rose during rotation of the linear scale connected thereto.

U.S. Pat. No. 3,881,253 of Haws shows a similar arrangement except that the roses are held by suction cups to a clear plastic panel overlying the map.

U.S. Pat. No. 2,736,096 of Greene shows a radio plotter including a pair of round compass portions 10 each with a projecting arm 12. As is best apparent from FIGS. 2 and 3, and column 3, lines 18–46, a separate thin metal disk 21 with a central pin 22 has a layer of adhesive 25 on the upper surface thereof. The pin 22/23 is pushed through the map or chart from the reverse side thereof so that the adhesive 25 bonds the disk 21 to the reverse side of the map. A combination compass/arm A is then connected to the pin on the front side of the map for rotation in the plane thereof. Head portion 23 of the pin 22 snaps through a hole 26 in the compass portion 10.

U.S. Pat. No. 3,187,434 of Casagrande discloses another marine navigation plotting device in which a map is mounted between two pieces of PLEXIGLASS plate. Holes are drilled through the plates at the location of the broadcast antennas. Slotted protractor arms 14, 15 and 16 are pivotally connected to the plates by thumb screws 24, 26 and 28 which are inserted through the slots in the arms and threaded into the holes drilled in the plates.

U.S. Pat. Nos. 3,281,942; 3,690,009; 3,813,783; 3,844,042; 4,095,342; and 4,359,628 show other related map navigational aids. Some of these, such as the Preuit and Henley, III devices, can be pinned to a map while others, such as the Hodge, Price and Lambert devices, are simply laid on top of a map.

While the foregoing patented devices can facilitate navigation to varying degrees, they are generally too complex and cumbersome to be used by a typical private pilot flying solo. Such a pilot must spend as much time as possible obeying the "see and be seen" rule of flying and therefore cannot afford to spend a great deal of time looking down at a map and manipulating various navigational rulers, etc. Furthermore, a number of the patented devices require extensive set up and entail the use of large boards which are cumbersome to have in the cramped cockpit of a small plane. In addition, the FAA regularly updates aerial maps. FAA regulations require that all pilots use the latest maps. Accordingly, many of the patented devices that require extensive set up must be repeatedly shifted to new maps. The devices themselves are generally too expensive to discard each time a new map is issued.

SUMMARY OF THE INVENTION

It is therefore the primary object of the present invention to provide an improved aerial map navigational aid.

The preferred embodiment of the present invention utilizes transparent pressure sensitive stick-on film disks in the form of compass roses and rotatable transparent film VOR arms which are removably attached to the center of the roses by cooperating male/female snap mechanisms. The function of the stick-on disks is to provide bolder compass markings that can be more easily read. The VOR arms rotate about vertical axes orthogonal to the plane of the map. The VOR arms have bold black center lines with distance markings thereon.

With the present invention, a pilot simply opens the desired aerial map to the area he or she is going to fly over, adheres the VOR roses over the corresponding printed compass roses on the map and attaches the VOR arms to the same. During flight, the pilot can easily turn the VOR arms to the correct compass readings for each VOR beacon based upon the readings from the on-board VOR receiver. The pilot's location is then the place where the center lines of the VOR arms cross. When a new area is flown over, new compass rose disks and female snaps may be applied over the new VOR beacons on the map. The old VOR arms can be snapped off and reattached at the new locations.

DESCRIPTION OF THE PREFERRED EMBODIMENT

Figure 1:
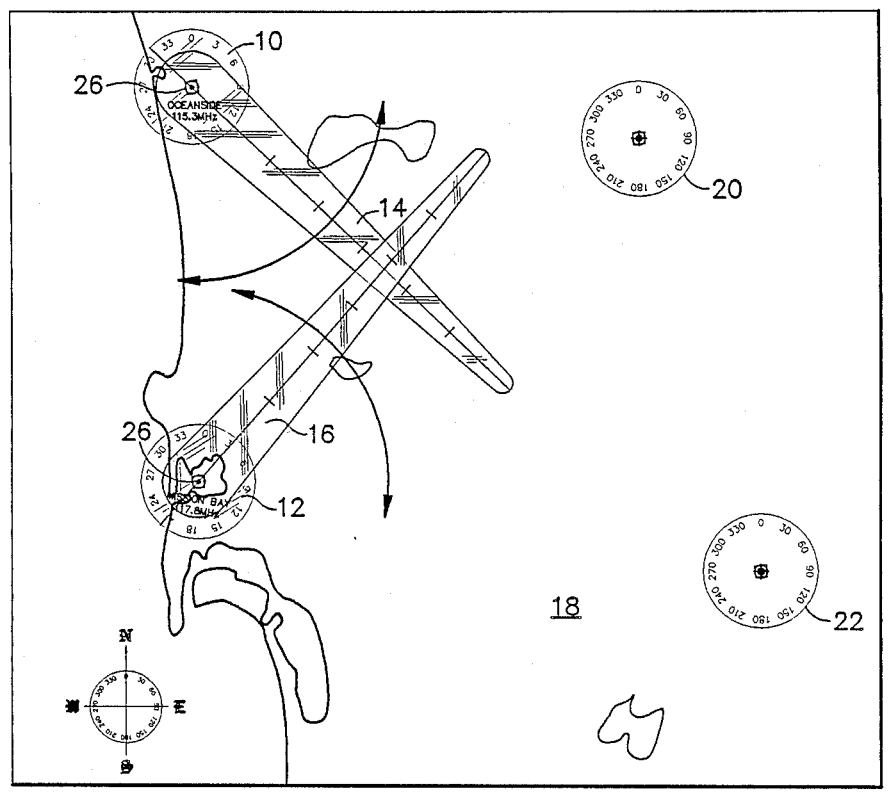
FIG. 1 is a simplified plan view of an aerial map with two spaced apart compass roses and VOR arms in accordance with a preferred embodiment of the present invention. The ends of the arms are crossed to indicate a current aircraft position.

Referring to FIG. 1, in accordance with a preferred embodiment of the present invention, transparent pressure sensitive stick-on film disks in the form of compass roses 10 and 12 and rotatable transparent film VOR arms 14 and 16 are attached to an aerial map 18. In the illustrated example, the map shows a portion of San Diego, County, Calif., including its coast line and bays. The transparent compass roses are adhered directly on top of two graphic VOR compass roses already pre-printed on the map. Two other pre-printed compass roses are illustrated at 20 and 22 on the map 18. The function of the transparent compass rose disks is to provide bolder compass markings that can be more easily read.

The VOR arms 14 and 16 (FIG. 1) are removably connected to the map by cooperating male/female snap mechanisms. The female snaps 24 (FIGS. 5 and 6) for the corresponding VOR arms are adhered to the tops of the compass roses 10 and 12, in the center thereof. The VOR arms 14 and 16 each have male snaps such as 26 (FIG. 4) inserted through the inner ends thereof so that they can be removeably connected to corresponding ones of the female snaps 24. The interconnected male and female snaps permit the VOR arms to rotate about corresponding vertical axes othogonal to the plane of the map. The VOR arms have bold black center lines 28 (FIG. 3) printed thereon. TIC marks 28a printed on the arms through the center lines represent a predetermined distance, e.g. ten nautical miles on a sectional chart and five nautical miles on a TCA chart.

Figure 2:
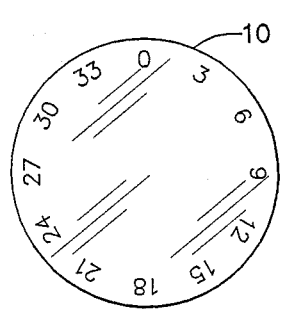
FIG. 2 is an enlarged plan view of one of the compass roses of the present invention.

Referring to FIG. 2, each compass rose disk such as 10 is preferably made of a thin, flexible transparent material such as acetate, MACTAC (Trademark) film, or other suitable plastic material. The twelve main compass directions are printed thereon as numbers appropriately spaced about the perimeter. These transparent compass roses are used on aviation sectional and TCA maps as an overlay to enhance the compass roses already pre-printed on the paper map around the VOR stations. Only digits representing an amount of degrees times ten are printed on each of the transparent rose disks and the compass TIC marks pre-printed on the map are still used to preserve navigational accuracy. Preferably the outside diameter of each transparent compass rose such as 10 closely approximates the outside diameter of the pre-printed compass roses on the map.

A quantity of a suitable pressure sensitive adhesive (not illustrated) is spread across the underside of each of the transparent compass rose disks. This permits them to be quickly attached to the map at the appropriate locations.

Figure 5:
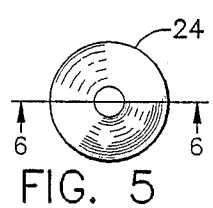
FIG. 5 is an enlarged top plan view of one of the female snaps which form one part of the rotatable attachment mechanism between the VOR arm and map.
Figure 6:
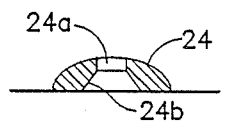
FIG. 6 is a sectional view of the female snap of FIG. 5 taken along line 6—6 thereof.

Referring to FIGS. 5 and 6, the female snaps 24 are also preferably made of acetate or other clear plastic material. They comprise a disk shaped body having a central round hole 24a therethrough which has a smaller diameter upper portion and which terminates in a flared lower portion 24b. The upper surface of the body is convex while the lower surface is flat for resting on the underlying compass rose. A layer of a suitable adhesive (not illustrated) is applied to the lower flat surface of the female snap body so that it can be permanently attached to the underlying compass rose. One suitable adhesive is SCOTCH (Trademark) No. 467 hi performance adhesive from 3M Company. I have also had good results with other adhesives such as those sold under the trademark FASSON.

To facilitate packaging and use, both the transparent compass rose disks and the female snaps may have peel off plastic layers (not illustrated) that conceal the adhesive on the underside until they are ready for use.

Figure 3:
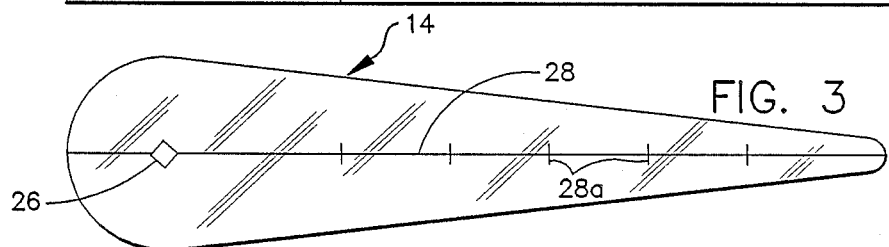
FIG. 3 is an enlarged plan view of one of the VOR arms of the the present invention.
Figure 4:
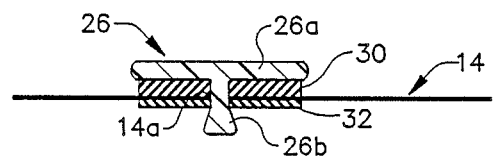
FIG. 4 is an enlarged vertical sectional view illustrating the releasable attachment mechanism between a compass rose and a VOR arm in accordance with the present invention.

Referring to FIG. 3, each VOR arm 14 is also preferably made of a thin, flexible transparent acetate film or other plastic material. For example, the arm may be die cut from a sheet of five mil thick acetate. The center line 28 and TIC marks may be printed or screened thereon. Referring to FIG. 4, the male snap 26 may consist of a commercially available NYLON (Trademark) material male clothing snap. It has an upper square planar body portion 26a and a round post 26b which extends downwardly from the center of the body portion 26a. The lower end of the post 26b (FIG. 4) is flared and had a diameter slightly larger than a hole 14a in the rear portion of the VOR arm 14 through which it is inserted. The outside diameter of the lower end of the post 26b is also slightly larger that the diameter of the upper portion of the hole 24a (FIG. 6) in the female snap. Thus the post 26b may be manually inserted through the upper portion of the hole 24a and the flared lower portion of the post 26b will snap into place inside the flared lower portion 24b of the hole in the female snap.

Friction bearing means are provided to maintain a fixed rotational position of the VOR arm relative to the coupled male and female snaps while still permitting manual rotation of the VOR arm when desired. This helps maintain the position of the arm as the map is moved around the cockpit. Referring to FIG. 4, a 0.040 inch thick ring 30 made of a rubber-like high surface friction material has a hole therethrough with a diameter slightly smaller than that of the flared portion of the post 26b of the male snap. This rubber ring is fit over the post and rests against the underside of the planar body portion 26a of the male snap 26. The VOR arm 14 is then fit over the post 26b and then a 0.020 thick acetate retaining ring 32 is also fit over the post. Again, the retaining ring 32 also has a hole in the center thereof with a diameter slightly smaller than that of the flared portion of the post 26b of the male snap. When the male snap 26 is coupled to the female snap 24, the retaining ring 32 squeezes the rubber ring 30 against the underside of the planar body portion 26a. The friction bearing means allows the VOR arm 14 to be manually rotated relative to the fixed female snap 24. However, the friction between the underside of the rubber ring 30 and the upper side of the acetate VOR arm 14 holds the arm in position once it is released. The complementarily male and female snaps allow the VOR arm to be quickly detached for re-attachment to another female snap over another compass rose.

With my invention, a pilot simply opens the desired aerial map to the area he or she is going to fly over, adheres the transparent VOR compass roses over the pre-printed compass roses on the map corresponding to the appropriate ground stations. The pilot then attaches the the female snaps to the centers of these transparent compass roses, and attaches the VOR arms to the same. The aircraft's radio receiver may be used to determine the precise direction to each of the two ground stations. By spinning the arms to these compass directions, a cross-fix is generated, i.e. the pilot's location is then the place where the center lines of the VOR arms cross. The distance from the ground stations is easily read from the TIC marks on the centerlines of the VOR arms. By constant attention to the needle centering equipment in the aircraft, the aircraft's exact position on the map can be followed. My invention facilitates (1) the lost procedure; (2) position tracking; (3) TCA/restricted airspace recognition and observance; and (4) the simplest form of a DME (distance measuring equipment).

When a new area on the map will be flown over, new compass rose disks and female snaps may be applied over the new VOR beacons on the map. The old VOR arms can be snapped off and attached onto the female snaps at new locations on the same map. When an updated map is released, new transparent compass roses and female snaps may be applied to the new map at the desired locations and the VOR arms from the old map transferred thereto. The old map can be discarded and it is not necessary to peel off the transparent compass roses and female snaps stuck thereto. This is because they are inexpensive, disposable, and easily replaced on the new map.

While I have described several preferred embodiments of my aerial map navigational aid, it should be understood that modifications and adaptations thereof will occur to persons skilled in the art. For example, the pilot need not use the adhesively attached transparent compass roses and may instead rely upon the roses already printed on the map. In such case, the female snaps are adhesively attached directly to the map itself, in the center of the appropriate pre-printed compass roses. Furthermore, my invention may be used to navigate other craft such as boats relative to other beacons, such as marine RDF beacons. Therefore, the protection afforded by invention should only be limited in accordance with the scope of the following claims.

I claim:

1. A system for determining a position of a craft on a map based on a pair of compass direction readings from a receiver tuned to receive signals from a pair of spaced apart transmitting stations whose locations are indicated on the map, comprising:
   a pair of elongate arms;
   a pair of releasably connectable and rotatable attachment mechanisms, each having a first part secured to an inner end of a corresponding one of the arms and a second part with a quantity of adhesive on an underside thereof for attachment to the map;
   a pair of friction bearing means for each permitting a corresponding one of the arms to be manually rotated relative to the second part of its corresponding attachment mechanism while also maintaining a fixed rotational position of the one arm when it is manually released; and
   a pair of compass rose disks each having a quantity of an adhesive on an underside thereof for attachment to the map over a pre-printed compass rose marking on the map surrounding the location of one of the transmitting stations and for having the second part of a corresponding attachment mechanism adhered to the center thereof;
   whereby the arms may be rotated to positions corresponding the compass direction readings and a position on the map adjacent the crossing of a pair of outer ends of the arms will represent the position of the craft on the map.

2. A system according to claim 1 wherein the arms are made of a transparent plastic material.

3. A system according to claim 1 wherein the compass rose disks are made of a transparent plastic material.

4. A system according to claim 2 wherein each of the arms has a center line with TIC marks printed thereon.

5. A system according to claim 3 wherein the compass rose disks have numbers printed around a periphery thereof indicating compass angles.

6. A system according to claim 1 wherein each friction bearing means includes a friction ring made of a rubber-like material positioned between one of the parts of the corresponding attachment mechanism and the inner end of the corresponding arm.

7. A system according to claim 1 wherein the first part of each of the attachment mechanisms comprises a male connector and the second part of each of the attachment mechanisms includes a female connector for releasably receiving the male connector.

8. A system according to claim 7 wherein the male connector has a planar body portion and a round post with a flared lower end connected to and extending from the planar body portion and the female connector has a hole therethrough with an upper portion having a diameter slightly smaller than a diameter of the flared portion of the post and the hole further having a flared lower portion with a diameter approximating the diameter of the lower flared portion of the post so that the post can be snapped into and releasably locked in the hole in the female connector.

9. A system according to claim 6 wherein each friction bearing means further includes a retaining ring made of a plastic material positioned for holding the friction ring against the inner end of the arm.

10. A method of determining the position of an aircraft relative to a pair of VOR beacons spaced apart over a predetermined terrain, comprising the steps of:
    providing an aerial map of the terrain having the relative locations of the VOR beacons indicated thereon by pre-printed compass roses;
    adhesively attaching the first parts of a pair of complementary, releasably connectable and rotatable attachment mechanisms to the centers of corresponding ones of the pre-printed compass roses;
    permanently connecting the second parts of the attachment mechanisms to the inner ends of a pair of elongate, transparent VOR arms having center lines and TIC marks printed thereon;
    releasably connecting the second parts of the attachment mechanisms to the first parts to thereby position the VOR arms for rotation in the plane of the map;
    manually rotating each of the VOR arms to a compass direction indicated by a VOR receiver with respect to signals received from a corresponding one of the VOR beacons to provide a cross-fix where the center lines of the VOR arms cross; and
    reading the TIC marks on the center lines of the VOR arms to determine the distance of the aircraft from each VOR beacon to thereby establish the location of the aircraft over the terrain.

11. A method according to claim 10 and further comprising the step of adhesively attaching a pair of transparent compass rose disks over corresponding ones of the pre-printed compass roses and thereafter adhesively attaching the first parts of the attachment mechanisms to the centers of corresponding ones of the compass rose disks.

12. A system for determining a position of a craft on a map based on a pair of compass direction readings from a receiver tuned to receive signals from a pair of spaced apart transmitting stations whose locations are indicated on the map, comprising:

a pair of elongate arms;

a pair of releasably connectable and rotatable attachment mechanisms, each having a male connector secured to an inner end of a corresponding one of the arms and a female connector for releasably receiving the male connector, the female connector having a quantity of adhesive on an underside thereof for attachment to the map wherein the male connector has a planar body portion and a round post with a flared lower end connected to and extending from the planar body portion and the female connector has a hole therethrough with an upper portion having a diameter slightly smaller than a diameter of the flared portion of the post and the hole further having a flared lower portion with a diameter approximating the diameter of the lower flared portion of the post so that the post can be snapped into and releasably locked in the hole in the female connector; and a pair of friction bearing means for each permitting a corresponding one of the arms to be manually rotated relative to the second part of its corresponding attachment mechanism while also maintaining a fixed rotational position of the one arm when it is manually released;

whereby the arms may be rotated to positions corresponding the compass direction readings and a position on the map adjacent the crossing of a pair of outer ends of the arms will represent the position of the craft on the map.

* * * * *